United States Patent
Mermelstein

(10) Patent No.: US 7,072,099 B2
(45) Date of Patent: Jul. 4, 2006

(54) RELATIVE INTENSITY NOISE (RIN) REDUCTION IN FIBER-BASED RAMAN AMPLIFIER SYSTEMS

(75) Inventor: Marc D. Mermelstein, Highland Park, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 409 days.

(21) Appl. No.: 10/282,407

(22) Filed: Oct. 29, 2002

(65) Prior Publication Data

US 2004/0080809 A1 Apr. 29, 2004

(51) Int. Cl.
*H01S 3/00* (2006.01)

(52) U.S. Cl. .................................................. 359/334
(58) Field of Classification Search ............... 359/334; 372/38.06
See application file for complete search history.

(56) References Cited

U.S. PATENT DOCUMENTS

| | | | | |
|---|---|---|---|---|
| 5,033,051 A | | 7/1991 | Werner | 372/3 |
| 5,253,267 A | * | 10/1993 | Johnson | 372/38.01 |
| 5,594,747 A | * | 1/1997 | Ball | 372/31 |
| 5,671,075 A | * | 9/1997 | Ramachandran et al. | 398/147 |
| 5,761,225 A | * | 6/1998 | Fidric et al. | 372/6 |
| 5,852,496 A | | 12/1998 | Gisin et al. | 356/477 |
| 5,909,306 A | | 6/1999 | Goldberg et al. | 359/337.1 |
| 6,175,668 B1 | | 1/2001 | Borrelli et al. | 385/11 |
| 6,204,921 B1 | * | 3/2001 | Strandjord et al. | 356/460 |
| 6,233,371 B1 | | 5/2001 | Kim et al. | 385/11 |
| 6,304,369 B1 | | 10/2001 | Piehler | 359/337.4 |
| 6,339,489 B1 | | 1/2002 | Bruyere et al. | 398/47 |
| 6,631,025 B1 | * | 10/2003 | Islam et al. | 359/334 |
| 6,765,678 B1 | * | 7/2004 | Strandjord et al. | 356/460 |
| 6,798,563 B1 | * | 9/2004 | Mailhot et al. | 359/334 |
| 6,813,067 B1 | * | 11/2004 | Birk et al. | 359/334 |
| 2003/0067952 A1 | * | 4/2003 | Tsukiji et al. | 372/36 |
| 2003/0090778 A1 | * | 5/2003 | Cattaneo et al. | 359/334 |
| 2003/0202237 A1 | * | 10/2003 | Harasawa | 359/334 |

FOREIGN PATENT DOCUMENTS

WO WO 9945612 A1 * 9/1999

* cited by examiner

*Primary Examiner*—Bernarr E. Gregory
*Assistant Examiner*—Deandra M. Hughes

(57) ABSTRACT

An arrangement for reducing the effects of pump signal relative intensity noise (RIN) in a Raman fiber amplifier. A portion of the output from a pump laser source is applied as an input to a compensating, lower power laser module, where fluctuations in the output power of the pump laser are used to control the bias current applied as an input to the compensating laser such that as the pump power increases, the bias current (and lower power laser output) decreases; conversely, as the pump power decreases, the bias current applied as an input to the compensating laser will be increased. The result is a relatively flat gain as seen by the information signal, thus minimizing the transfer of relative intensity noise from the pump to the signal.

14 Claims, 9 Drawing Sheets

RELATIVE INTENSITY NOISE (RIN) REDUCTION IN FIBER-BASED RAMAN AMPLIFIER SYSTEMS

TECHNICAL FIELD

The present invention relates to Raman fiber amplifiers and, more particularly, to a technique for reducing the effects of relative intensity noise (RIN) associated with a pump source in a Raman amplifier.

BACKGROUND OF THE INVENTION

Raman amplification is a technique well-known in the art for amplifying signal laser light in a fiber optic telecommunications data link. Three approaches to Raman amplification have been investigated to date, defined as "first order", "second order" and "third order". In first order Raman amplification, the pump and signal laser radiation are separated by a single Raman stokes shift. The pump and signal laser radiation in second and third order Raman amplification are separated by two and three Stokes shifts, respectively. These latter schemes require the use of "seed" lasers to provide a small amount of radiation in the intervening orders (e.g., in the first order for a second order system, or in the first and second orders for a third order system) in order to bring the pump energy to the optical information signal.

Many Raman amplifier arrangements, particularly second order and third order systems, require relatively high power (e.g., 1 W or more) pump sources. In most cases, conventional semiconductor lasers cannot provide such power, resulting in the use of Raman fiber lasers as pump sources in these higher order systems. One problem with Raman fiber lasers is that they have been found to exhibit relative intensity noise (RIN) levels higher than those found in semiconductor laser diodes. These higher RIN levels are of minimal concern in the counter-pumped configuration where the signal and the pump travel in opposite directions through the fiber amplifier and the signal is therefore amplified by an averaged pump power. However, in a "co-pumped" Raman amplifier where the pump and message signals propagate in the same direction through the fiber amplifier, excessive levels of RIN transfer from the pump to the signal have been problematic. In the co-pumped architecture, pump power fluctuations induce gain fluctuations at the signal laser wavelength, resulting in a transfer of noise from the pump to the signal. This degrades the optical signal-to-noise ratio (OSNR) of the optical information signal and the performance of the data link.

Thus, a need remains in the art for a technique to minimize the problems associated with pump signal RIN in a co-pumped (or counter-pumped) Raman fiber amplifier application.

SUMMARY OF THE INVENTION

The need remaining in the art is addressed by the present invention, which relates to Raman fiber amplifiers and, more particularly, to a technique for reducing the effects of relative intensity noise (RIN) associated with a pump source in a Raman amplifier arrangement.

In accordance with the present invention, power fluctuations in a pump laser source are monitored and the fluctuation signal is applied as a portion of the bias current input to a low power semiconductor (seed) laser whose output power is thus intensity-modulated as a function of the pump power fluctuations. As a result, by controlling the power of the seed laser, the power fluctuations in the pump laser can be compensated, thus minimizing the presence of RIN and/or the transfer of RIN from the pump laser to the optical information signal.

In one embodiment of the present invention, a fiber optic tap and photodetector are used to monitor the power fluctuations in an associated pump laser, where the electrical output signal from the photodetector is passed through an inverting amplifier/phase delay and applied as a bias input signal to the low power semiconductor (seed) laser diode. In a first order Raman fiber amplifier embodiment of the present invention (i.e., pump source and information signal directly applied as inputs to the fiber amplifier), a portion of the pump laser output is tapped off and used as an intensity-modulated bias control input to a low power laser operating at the same wavelength as the pump laser. The intensity modulated output from the low power laser will essentially cancel out the power fluctuations in the pump source and generate a flat gain response in the fiber amplifier. In both a second order and third order Raman amplifier, a seed laser (operating at a different wavelength) is present to provide the necessary Stokes shift. In these embodiments, as with the first order arrangement, the tapped-off output from the pump source is used to generate an intensity-modulated input bias control signal for the seed laser.

One exemplary arrangement of the present invention utilizes a Raman fiber laser as the pump source in order to provide the relatively high power signal required for higher order Raman fiber amplifiers. The technique of the present invention, however, is considered to be equally applicable to various pump sources that exhibit noise problems.

Other and further embodiments and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
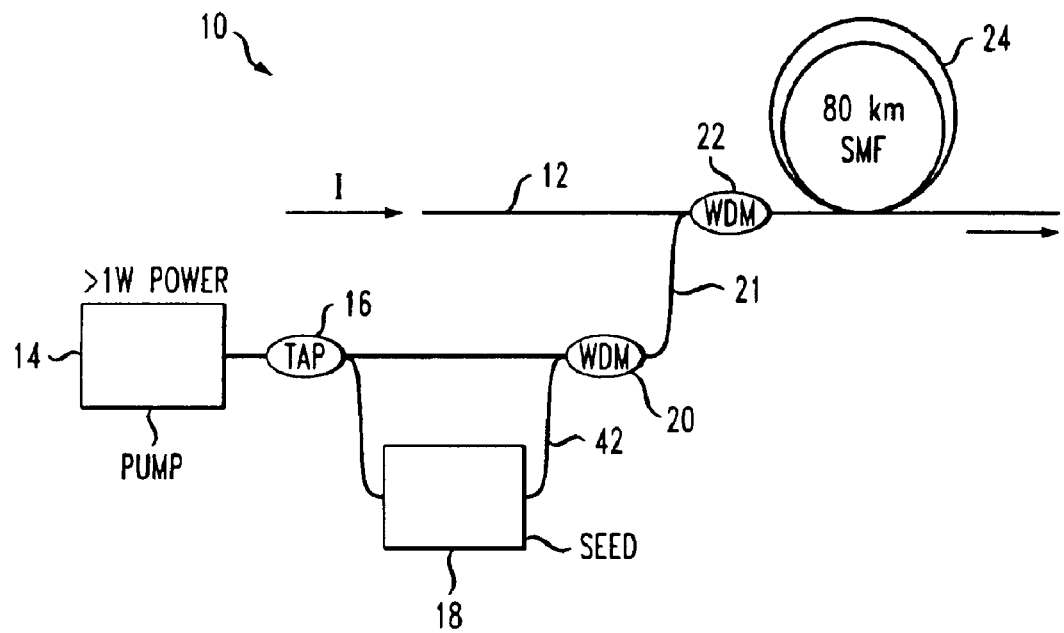
FIG. 1 illustrates an exemplary arrangement of the present invention, incorporating a control arrangement for a seed laser in a second-order Raman fiber laser arrangement.

An exemplary second-order co-pumping Raman fiber amplifier 10 formed in accordance with the present invention is illustrated in FIG. 1. As shown, amplifier 10 comprises a first optical fiber signal path 12, where the optical information signal I is applied as an input to first fiber signal path 12. A Raman fiber laser 14 is used to provide the high power, second order pump signal R for this arrangement. It is to be understood that the use of a Raman fiber laser as a pump source is exemplary only, and various other sources may be used to supply the relatively high power pump signal required for a second-order (or third-order) system, where the principles of the present invention are equally applicable to any such arrangement. An optical tap 16 is used to remove a portion of the output from Raman fiber pump laser 14 and apply it as an input to a low power, first-order (seed) laser module 18. As will be discussed below in association with FIG. 3, in contrast to conventional second-order arrangements where a seed laser having a constant output power is used, second-order laser module 18 of the present invention taps off the optical output R from pump source 14, converts the optical signal into an electrical equivalent that is used to drive a low power, first-order seed laser device (such as a semiconductor laser). A coupling device 20, such as a wavelength division multiplexer, then couples the intensity-modulated optical output seed signal S from first-order laser module 18 with pump signal R onto a section of optical fiber 21, as shown in FIG. 1 The multiplexed pump and seed signals (R and S, respectively) are then applied as a first input to a second coupler (WDM) 22, where the optical information signal I propagating along input fiber 12 is also coupled into second WDM 22. The combination of information signal I with multiplexed signals R and S is subsequently coupled into a span of single mode fiber 24, where Raman amplification of information signal I then occurs in a manner well-known in the art. In accordance with the teachings of the present invention and as will be discussed in detail below, the seed laser power is intensity-modulated by the fluctuations in the pump power level in a manner that will stabilize the net gain provided to the information signal I, thereby minimizing the RIN transfer from the pump laser to the information signal. In particular, if the pump power increases, then an appropriate decrease in power of the seed laser module 18 will minimize the RIN transfer (similarly, a decrease in the pump power will cause an increase in the seed laser output power). As is well-known in the art, since the pump signals R and S are propagating through fiber 24 in the same direction as information signal I, the arrangement as shown in FIG. 1 is defined as a "co-pumping" configuration. The principles of the present invention, however, are considered to be equally applicable to a counter-propagating configuration where the pump and information signals travel in opposite directions through the single mode fiber span. Again, as mentioned above, the compensation technique of the present invention is considered to be applicable beyond particular embodiments using a Raman fiber laser as a pump source, and is generally useful in Raman fiber amplifiers utilizing one or more pump signals to generate Raman amplification of an optical input signal in a fiber amplifier.

Figure 2:
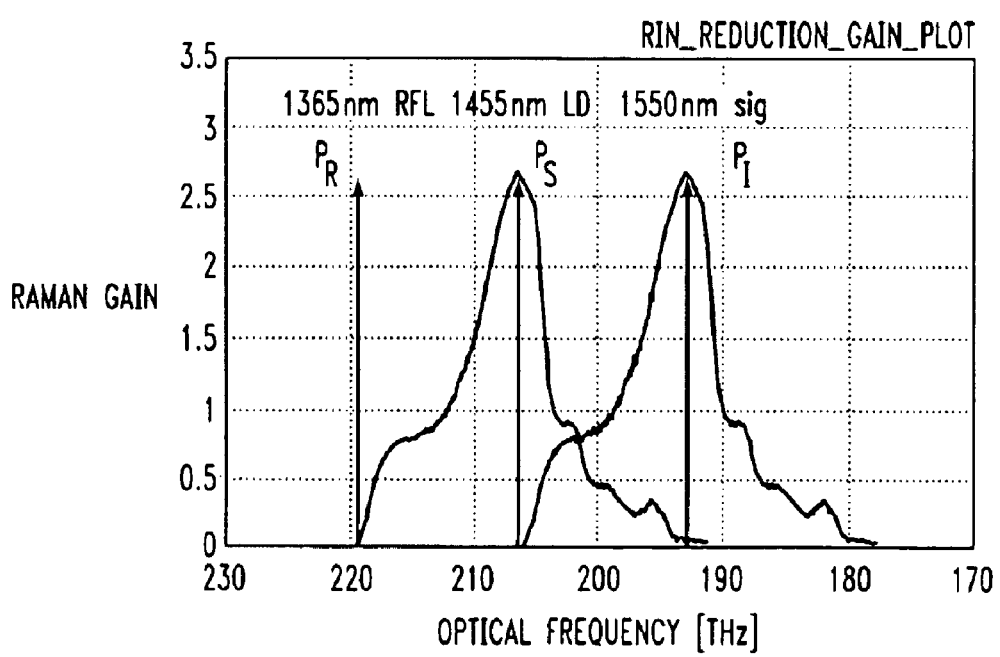
FIG. 2 contains three plots of Raman gain curves for the second-order arrangement of FIG. 1, including the Raman fiber laser, seed laser and signal laser.

FIG. 2 contains a plot of Raman gain curves for an exemplary set of three signals I, R and S as illustrated in FIG. 1. Particularly illustrated is the Raman gain curve for high power, second order Raman fiber pump laser 14, which generates a pump signal R at a wavelength of (for example) 1365 nm, low power, first order "seed" laser module 18, which generates an intensity-modulated seed signal S at a wavelength of 1455 nm, and information signal I propagating along fiber 12 at a wavelength of, for example, 1550 nm. As mentioned above, in a prior art co-pumping amplifier arrangement (i.e., without a connection between the output of fiber Raman pump laser 14 and seed laser module 18), fluctuations in the power level $P_R$ of Raman fiber pump laser 14 result in fluctuations in the power level $P_S$ of seed laser 18 and, as a result in the gain provided to information signal I as it propagates through fiber 24. A small amount of additional gain is also provided by Raman fiber laser 14 directly to information signal I. These variations in gain in the information signal I necessarily result in fluctuations in the information signal as it passes through fiber 24. As mentioned above, the transfer of power fluctuations from Raman fiber laser 14 to the information signal I is referred to as "relative intensity noise" (RIN) transfer.

Figure 3:
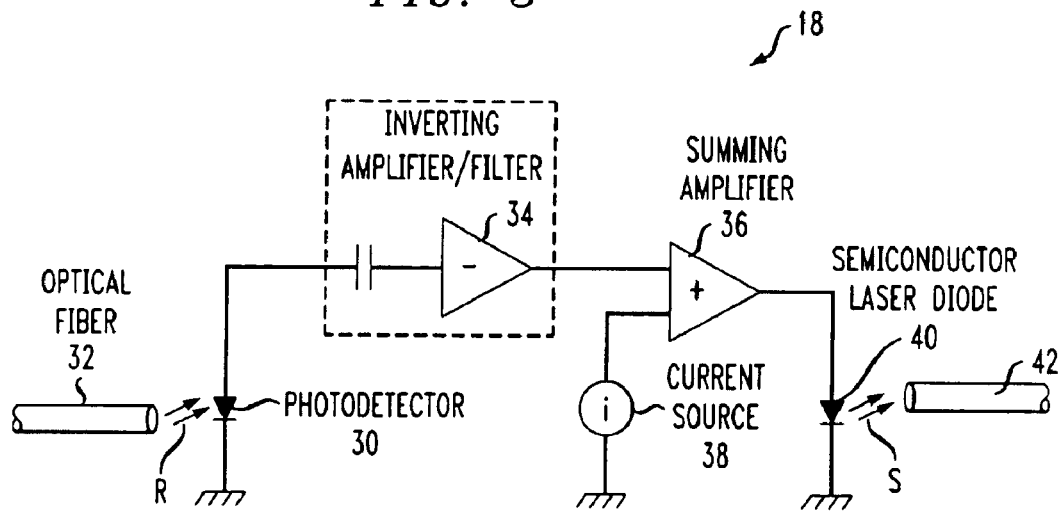
FIG. 3 contains a detailed diagram of an exemplary control arrangement useful with a seed laser to minimize RIN transfer in accordance with the present invention.

FIG. 3 illustrates an exemplary intensity-modulated seed laser module 18 that may be used in the inventive arrangement as shown in FIG. 1. Seed laser module 18 is illustrated as comprising a photodetector 30 that is coupled to an input fiber 32, used to receive the tapped-off portion of the output signal R from a pump signal source (such as Raman fiber pump laser 14 of FIG. 1). The photocurrent output from photodetector 30 is then amplified and phase-shifted in an inverting amplifier/filter 34 and applied (in the "inverted", negative form) as a first input to a summing amplifier 36. The remaining input to summing amplifier 36 is shown as a constant current source 38. The output from summing amplifier 36 is thereafter utilized as the bias current input to a low power semiconductor laser diode 40, which is utilized as the "seed" laser device in this particular second-order embodiment of the present invention. In accordance with the present invention, therefore, the value of the bias current will contain a modulation component, associated with the pump signal power fluctuations, where this modulation component controls the input bias current (and as a result, the output power) of low power semiconductor laser device 40. The optical output from laser diode 40, denoted as the intensity-modulated seed output signal S from seed laser module 18, is thereafter coupled into an optical fiber 42 and applied as an input to first WDM 20, as discussed above in association with FIG. 1. This combination of a pump laser power monitor, electrical signal processing and low power, intensity-modulated laser diode in accordance with the present invention is referred to as an "optical-electrical-optical" (OEO) converter, used for generating the intensity-modulated seed laser output for second order pumping RIN transfer reduction in accordance with the present invention.

The evolution of the optical power $P_R$, $P_S$ and $P_I$, corresponding to the 1365 second order Raman pump R, the 1455 nm seed laser S, and the 1550 nm optical information signal I, are governed by the following three coupled partial differential equations:

$$\frac{\partial P_1}{\partial z} - \frac{1}{v_1} \cdot \frac{\partial P_1}{\partial t} = -\alpha_1 \cdot P_1 - \gamma_{12} \cdot P_1 \cdot P_2 - \gamma_{13} \cdot P_1 \cdot P_3$$

$$\frac{\partial P_2}{\partial z} - \frac{1}{v_2} \cdot \frac{\partial P_2}{\partial t} = -\alpha_2 \cdot P_2 + \gamma_{12} \cdot P_1 \cdot P_2 - \gamma_{23} \cdot P_2 \cdot P_3$$

$$\frac{\partial P_3}{\partial z} - \frac{1}{v_3} \cdot \frac{\partial P_3}{\partial t} = -\alpha_3 \cdot P_3 + \gamma_{13} \cdot P_1 \cdot P_3 + \gamma_{23} \cdot P_2 \cdot P_3$$

where $v_i$ are the group velocities, $\alpha_i$ are the fiber loss coefficients, $\gamma_{ij}$ are the Raman gain coefficients and the indices i,j=1, 2, 3, which refer to signals R, S and I, respectively. The spatial and time-dependent optical powers are given by:

$$P_1(z, t) = \overline{P}_1(z) \cdot [1 + M_1(z, t)]$$
$$P_2(z, t) = \overline{P}_2(z) \cdot [1 + M_2(z, t)]$$
$$P_3(z, t) = \overline{P}_3(z) \cdot [1 + M_3(z, t)].$$

where the steady-state optical power at location z along fiber 24 (see FIG. 1) is given by $$\overline{P}_i(z)$$

(where the bar indicates a time average) and the power fluctuations are given by the modulation indices $M_i(z,t)$. The spatial and temporal components of the modulation indices may be separated and written as:

$$M_1(z, t) = m_1(z) \cdot \exp(i \cdot \Omega \cdot t)$$
$$M_2(z, t) = m_2(z) \cdot \exp(i \cdot \Omega \cdot t)$$
$$M_3(z, t) = m_3(z) \cdot \exp(i \cdot \Omega \cdot t)$$

where a sinusoidal time dependence at an angular frequency $\Omega$ is assumed and the complex spatial modulation indices are defined as $m_i(z)$. These equations may be solved numerically for the spatial evolution of the steady state powers P and the real and imaginary components of the complex spatial modulation indices $m_i(z)$.

Figure 4:
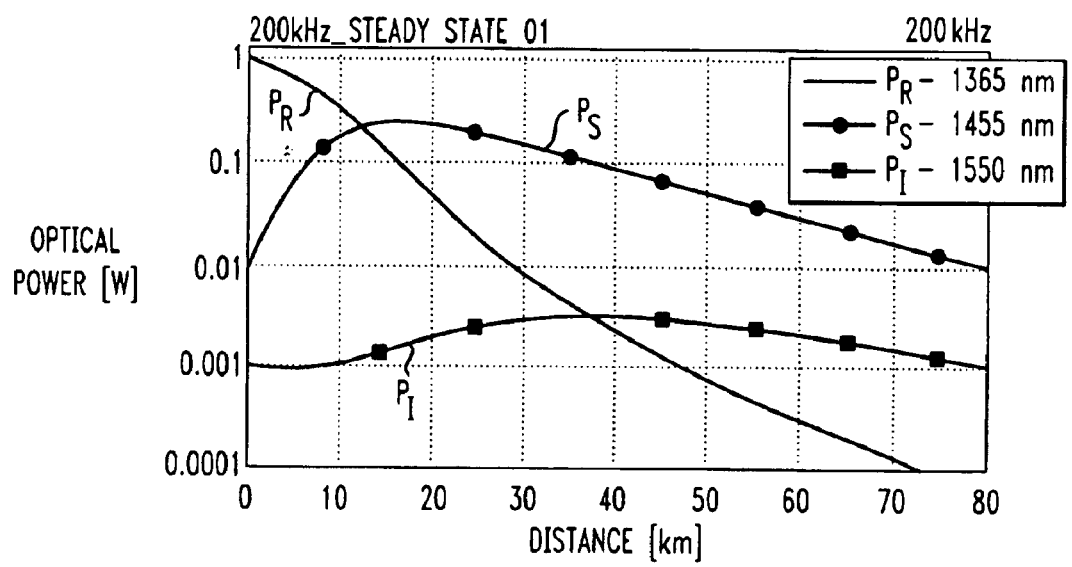
FIG. 4 is a graph of optical power as a function of fiber position for a power-controlled Raman fiber laser, seed laser and signal laser in accordance with the present invention.

Presuming that fiber 24 spans a distance of 80 km along a standard signal mode fiber (amplified to transparency), the spatial evolution of the second order Raman fiber laser pump R, seed laser S and information signal I steady-state powers are as shown in FIG. 4. In particular, FIG. 4 is a plot of optical power as a function of distance along the 80 km fiber span. As shown, the large power in the 1365 nm Raman laser 14 pumps the 1455 nm seed laser module 18, which spreads the gain over the fiber span, resulting in a nearly flat gain response for information signal I.

Figure 5:
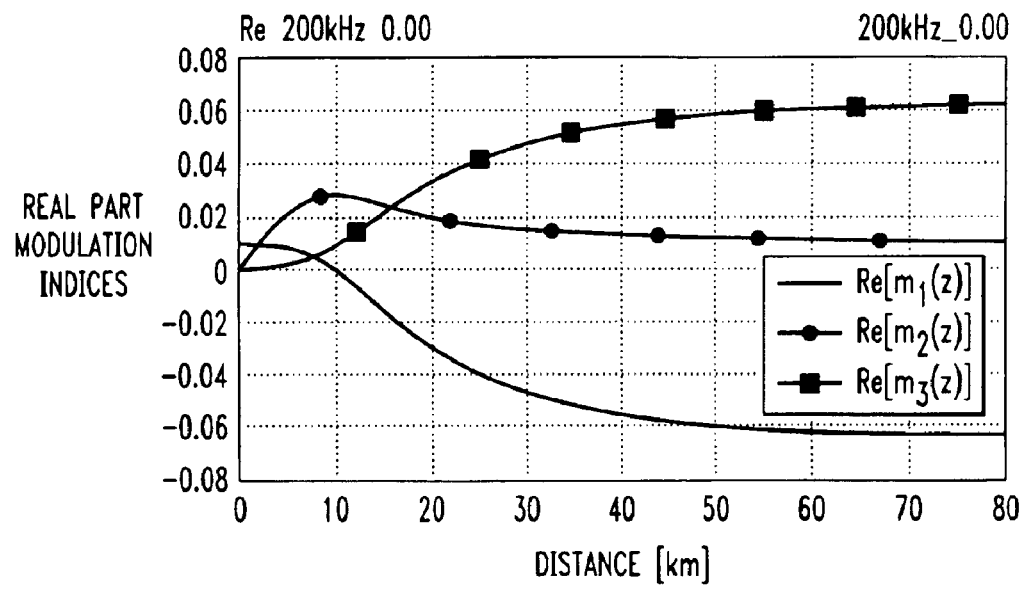
FIG. 5 contains a plot of the real portion of the spatial modulation index as a function of position along the fiber ("span position") for a conventional prior art arrangement.
Figure 6:
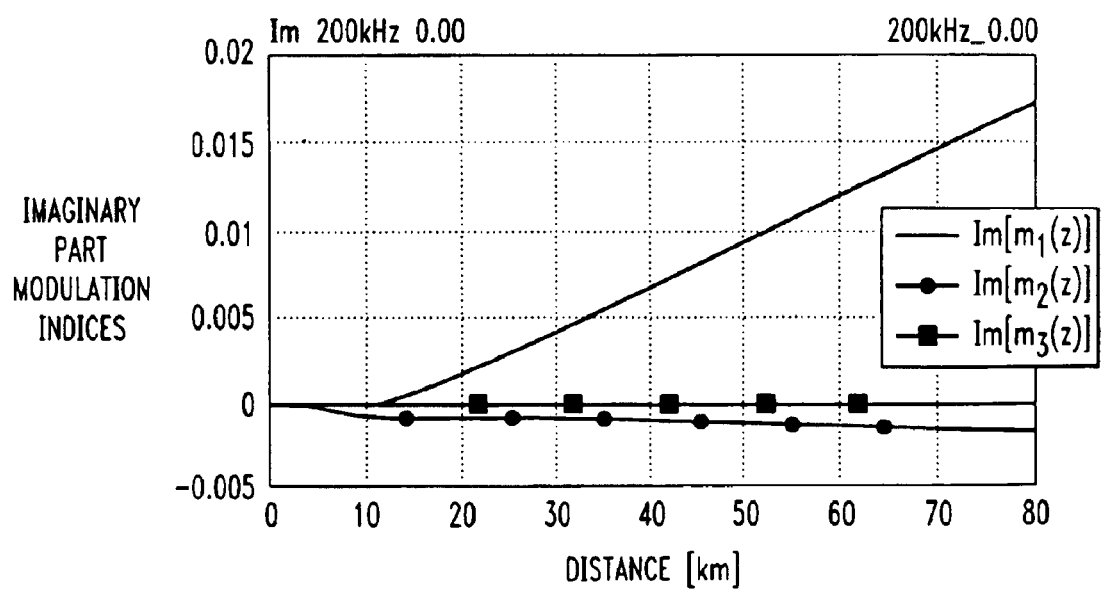
FIG. 6 contains a plot of the imaginary portion of the spatial modulation index as a function of span position for a conventional prior art arrangement.

The real and imaginary components of the associated spatial modulation indices for these three signals (R, S and I) in a conventional, prior art configuration, are shown in FIGS. 5 and 6, respectively. For the purposes of this example, a 200 kHz noise component was impressed upon RF pump laser 14, with a modulation index of 0.01 at the input of the fiber span. Seed laser module 18 and information signal I are presumed to be "noiseless". Referring to FIG. 5, it is seen that as information signal I propagates down the span of fiber 24, the real part of the signal modulation index increases significantly. This result can be associated with the RIN transfer from Raman fiber pump laser 14 to the information signal, as mediated by seed laser module 18. The imaginary part, as shown in FIG. 6, remains nearly equal to zero.

Figure 7:
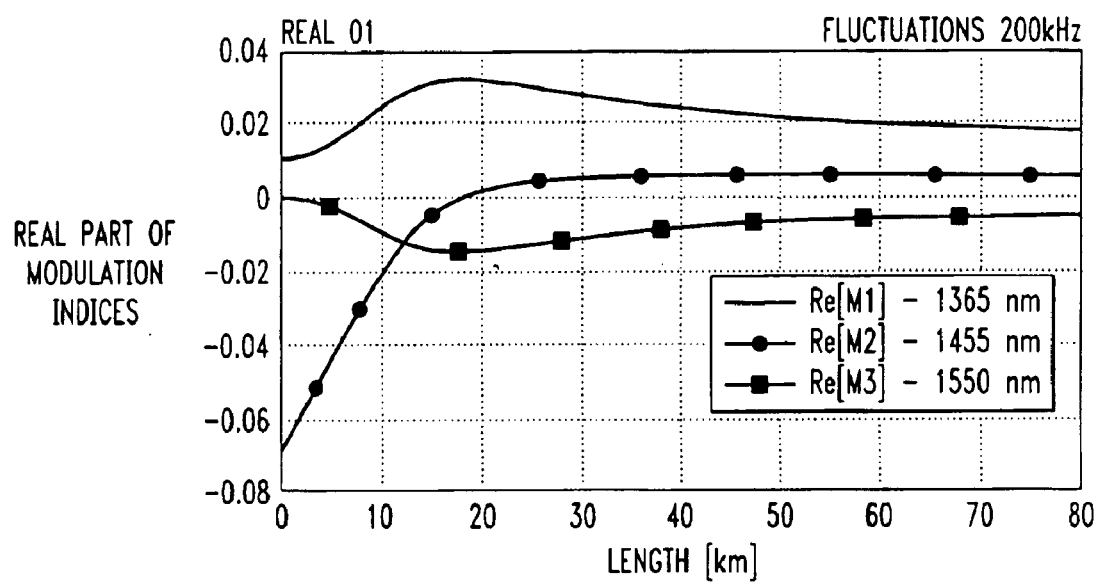
FIG. 7 contains a plot of the real portion of the spatial modulation index as a function of span position for a power-controlled Raman fiber laser of the present invention.
Figure 8:
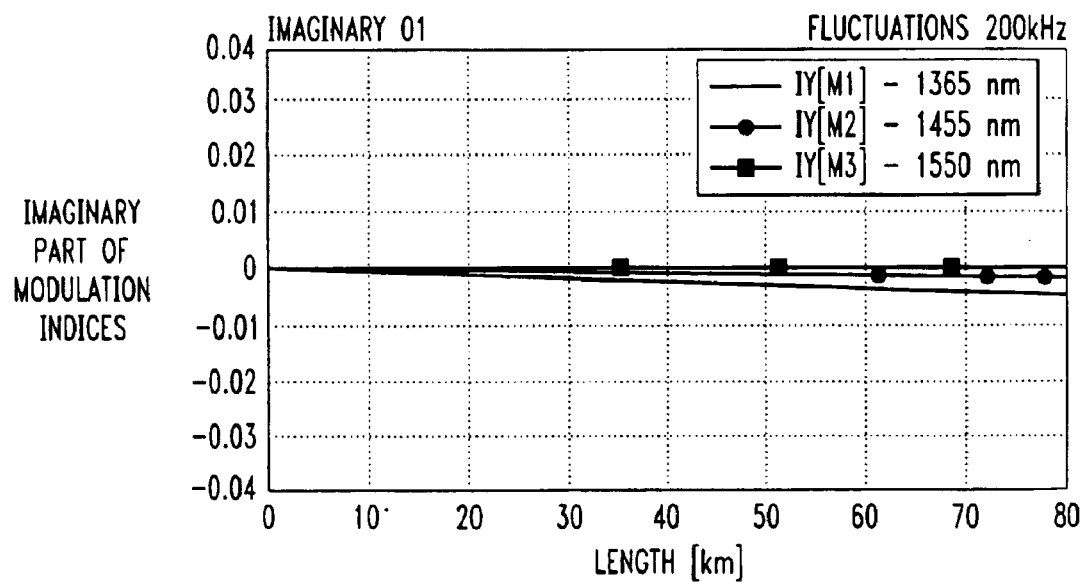
FIG. 8 contains a plot of the imaginary portion of the spatial modulation index for a power-controlled Raman fiber laser.

The RIN transfer can be reduced, in accordance with the present invention, by modulating the seed laser (out of phase) at 200 kHz, as accomplished with the OEO arrangement of the present invention as illustrated in particular in FIG. 3. FIGS. 7 and 8 illustrate the real and imaginary components of the spatial evolution of the modulation indices when the OEO arrangement of the present invention is utilized between pump source 14 and seed laser source 18. As shown in the plot of FIG. 7, introducing a −0.07 modulation index to seed laser module 18 has been found to reduce the signal modulation index at the exit of fiber 24 (e.g., the end of the span) from 0.06 to −0.004.

Figure 9:
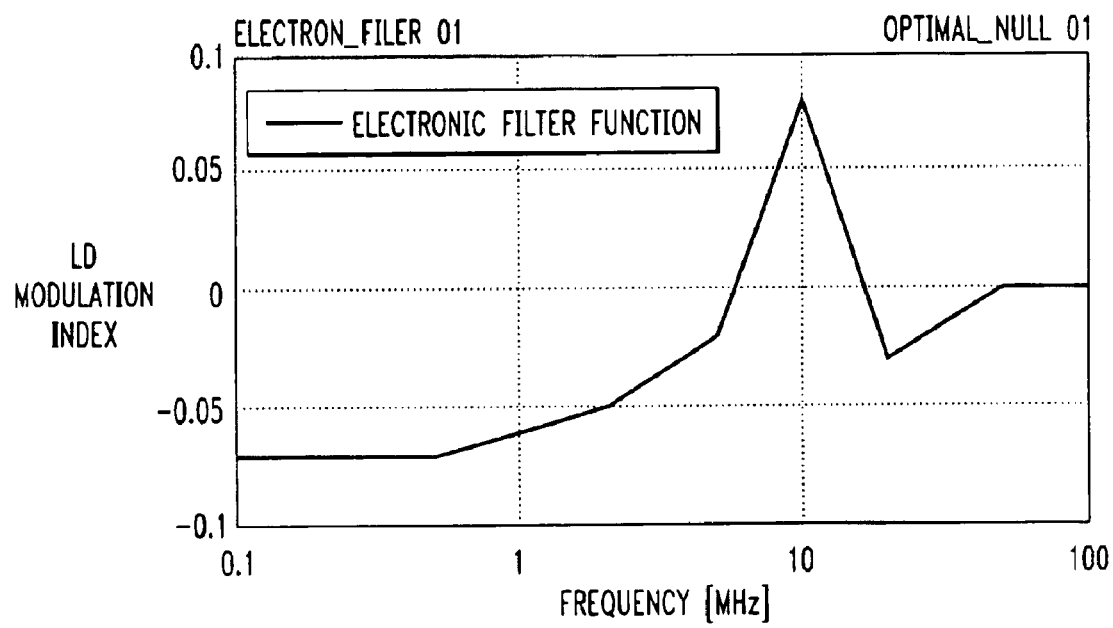
FIG. 9 contains a plot of laser diode modulation index as a function of frequency for minimum RIN transfer in accordance with the preset invention.

The optimal feedback modulation index for low power semiconductor seed laser module 18, in terms of minimizing the RIN transfer, has been found to be a function of frequency. FIG. 9 is a plot of the optical seed laser diode modulation index for minimizing RIN transfer as a function of frequency. The peak in the modulation index spectrum appears in the vicinity of the RIN transfer corner frequency.

Figure 10:
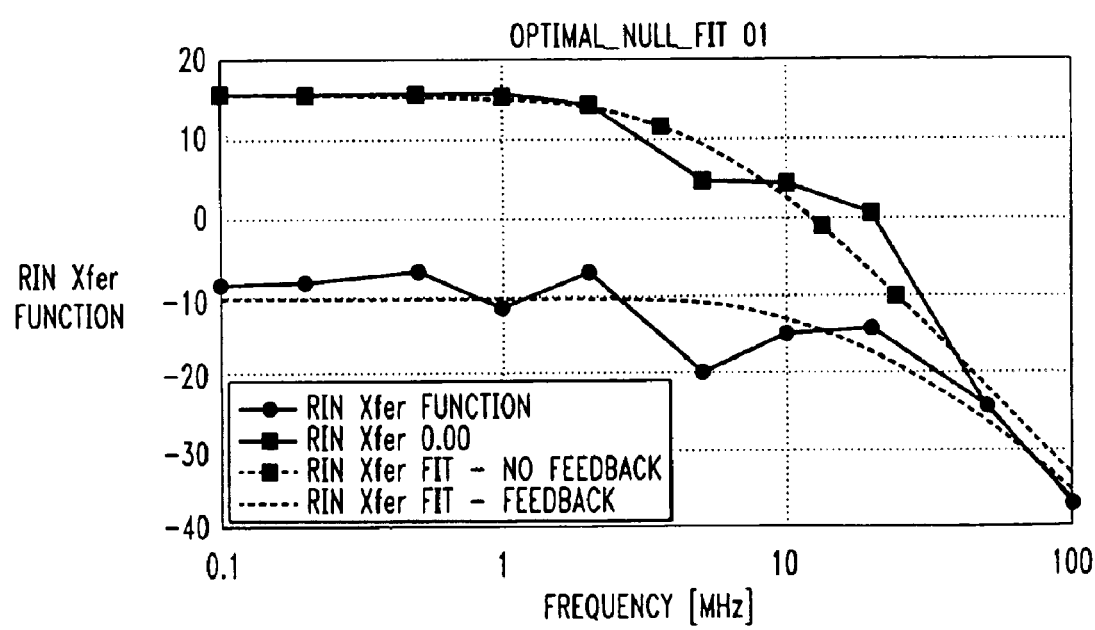
FIG. 10 is a plot comparing co-propagating RIN transfer functions with and without power feedback.

In order to assess the improvement in Raman amplifier performance, the RIN transfer function in the co-propagating configuration of FIG. 1 can be computed both "with" and "without" the OEO converter for generating an intensity-modulated seed laser output signal in accordance with the present invention. FIG. 10 illustrates exemplary transfer functions for arrangements "with" and "without" the OEO converter, where the transfer function "with" OEO input uses the index modulation spectrum shown above in FIG. 9. As illustrated by the improvement in this transfer function result, the inventive technique reduces the RIN transfer function by more than 20 dB. It is expected that the RIN transfer function T(f) can be characterized by a double-pole low pass filter function defined as follows:

$$T(f) = T(0) \cdot \left[1 + \left(\frac{f}{f_1}\right)^2\right]^{-1} \cdot \left[1 + \left(\frac{f}{f_2}\right)^2\right]^{-1}$$

where T(0) is defined as the low frequency transfer function, and $f_1$ and $f_2$ are the two corner frequencies. The dashed lines in FIG. 10 illustrate the associated filter transfer functions, corresponding to a non-linear least squares fit to the double-pole filter function.

Figure 11:
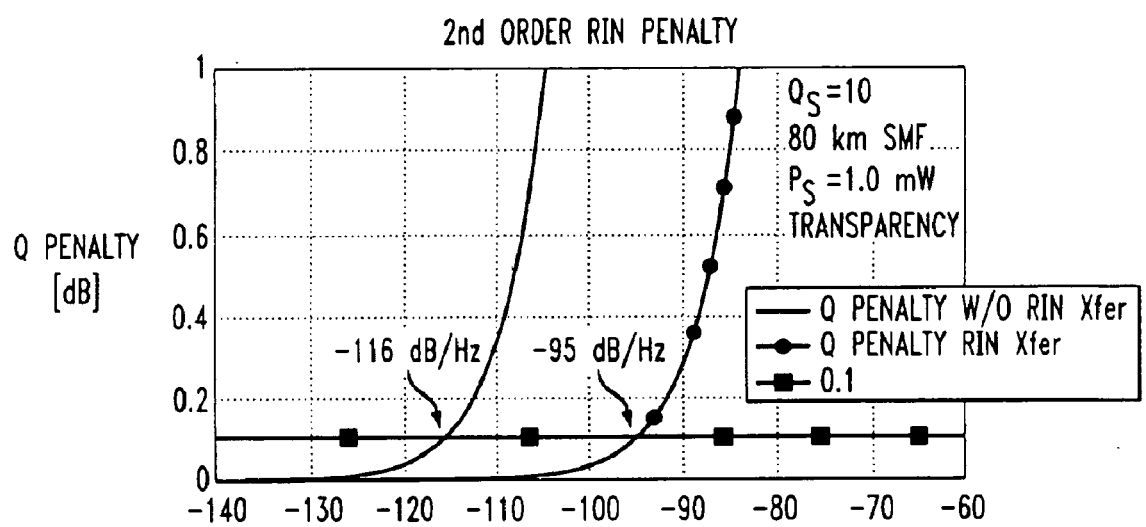
FIG. 11 is a plot of Q-penalty power as a function of lower order laser RIN level.
Figure 12:
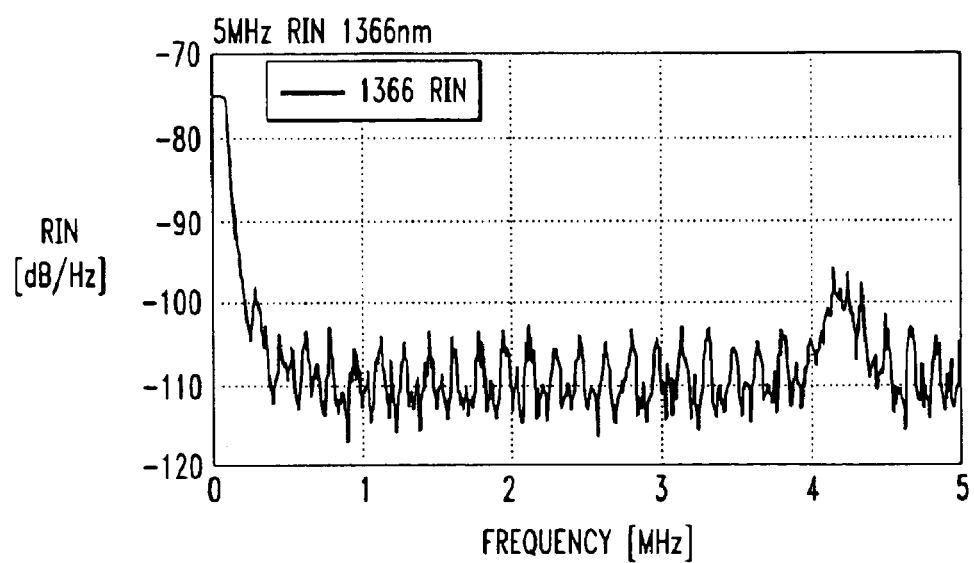
FIG. 12 contains a plot illustrating RIN level as a function of frequency for an exemplary Raman fiber laser.

The improvement in system performance can be quantified by a Q-penalty analysis. Shown in FIG. 11 is the Q-penalty as a function of the Raman fiber laser (1365 nm) RIN level, both "with" and "without" modulation of seed laser module 18 (as above), for an 80 km span of standard single mode fiber. The first order pump RIN spectrum is assumed to be a band-limited white noise spectrum with a bandwidth equal to 10 GHz, as determined by photodetector 30. In most cases, an acceptable RIN level is defined as that level which generates a Q-penalty of 0.1 dB. Referring to FIG. 11, it is seen that the modulation of seed laser module 18, with the filter function shown in FIG. 10, reduces the lower order RIN requirement from −116 dB/Hz to −95 dB/Hz. FIG. 12 is a plot illustrating the RIN level as a function of frequency for an exemplary Raman fiber laser. In particular, the plot shows the measured RIN values for a 1366 Raman fiber laser in a 5 MHz bandwidth, where it is seen that the RIN levels are below the −95 dB/Hz requirement FIG. 13 contains a diagram of an experimental arrangement 50 used to verify the improvement in performance of a Raman fiber amplifier in the presence of RIN transfer reduction in accordance with the present invention. For the purposes of the experiment, a input information signal source 52 operating at a wavelength of 1560 nm was applied as a first input to a first WDM 54, with a modulated, high-power pump signal at a wavelength of 1370 (from a pump source 56) is applied as a second input. A signal generator 58 was used for the purpose of the experiment to apply a predetermined modulation signal to the pump signal so as to simulate the presence of "relative intensity noise" in pump source 56. The multiplexed combination of modulated pump signal R and information signal I was then applied as an input to a second WDM 60, where a modulated, low power seed laser source 62 was applied as the second input to WDM 60 and used to supply the desired intensity-modulated compensation signal to pump signal R. A second signal generator 59, providing essentially the same modulation signal and phase locked with signal generator 58, was used to modulate the output from seed laser source 62 (thus representing the tapped-off output from the pump laser in the inventive OEO converter shown in FIG. 3). The multiplexed combination of signals was then passed through an exemplary Raman fiber amplifier 64 and the output measured by an RF spectrum analyzer 66.

Figure 13:
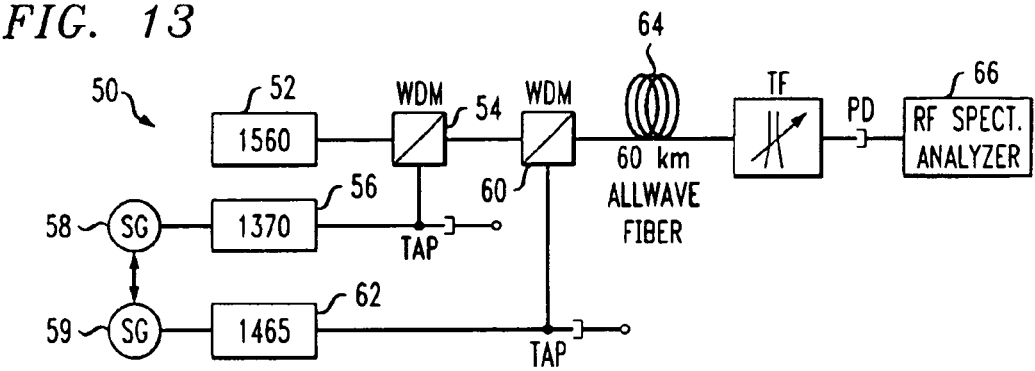
FIG. 13 is a diagram of a particular experimental arrangement used to test the RIN transfer reduction principles of the present invention.
Figure 14:
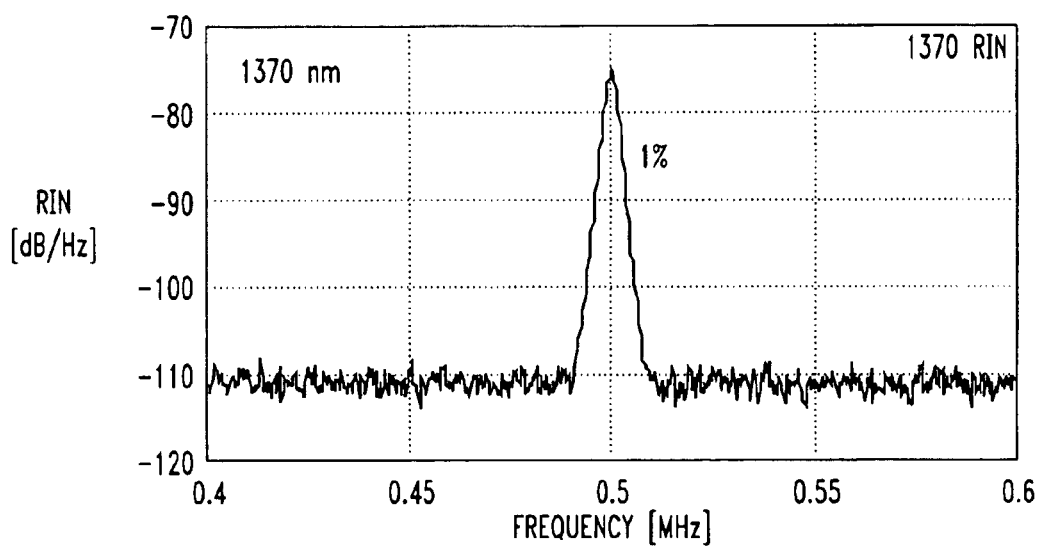
FIG. 14 is a graph of an exemplary pump signal used in the experimental arrangement of FIG. 13.
Figure 15:
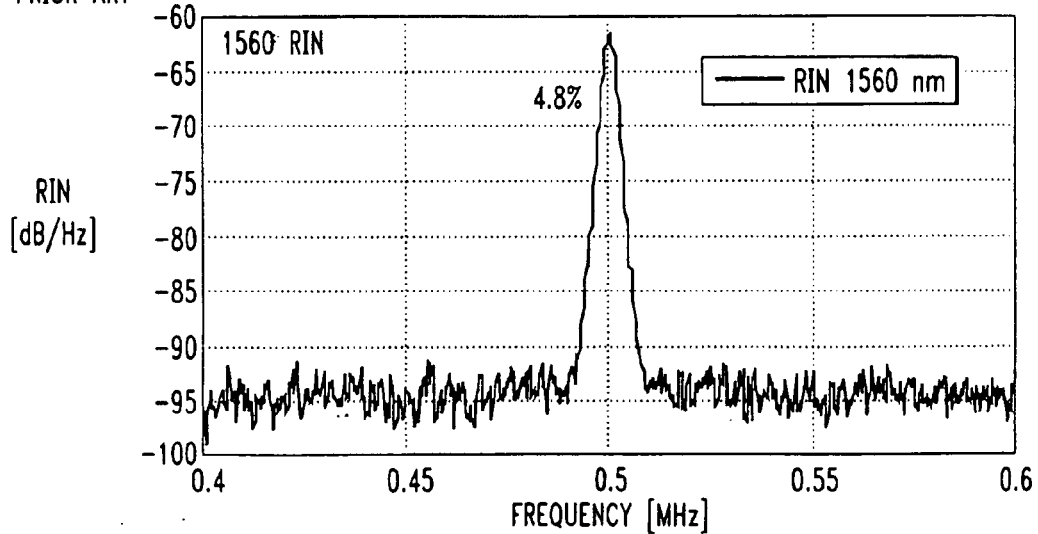
FIG. 15 is a graph of the RF spectrum of an amplified information signal in the presence of RIN transfer when the compensation arrangement of the present invention is not used.
Figure 16:
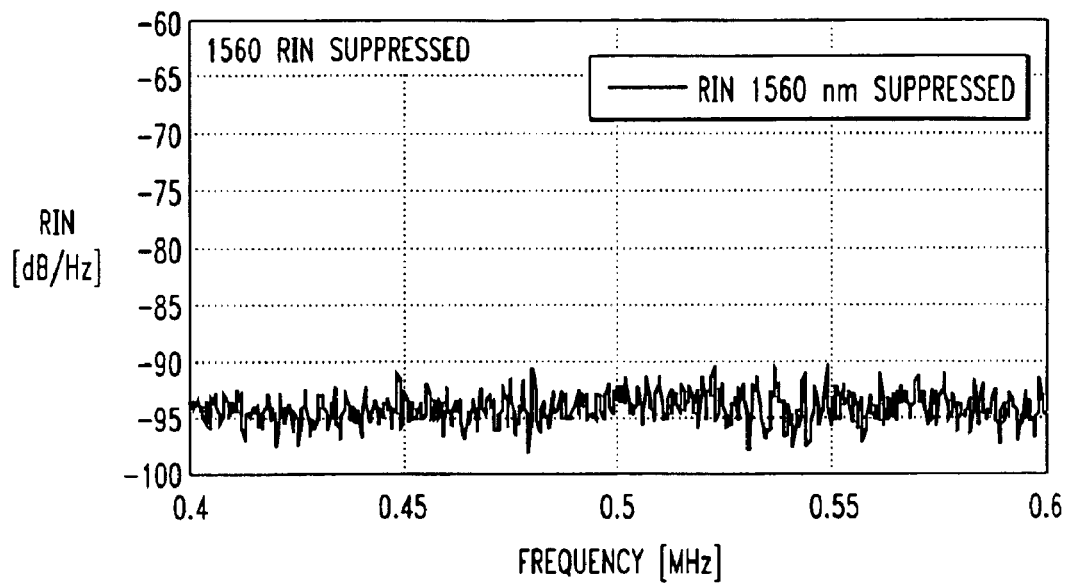
FIG. 16 is a graph of the RF spectrum of an amplified information signal for an arrangement using the RIN compensation technique of the present invention, illustrating the improvement in performance over the results shown in FIG. 15.

FIG. 14 contains a graph of the RF spectrum of the intensity-modulated pump signal R as shown in FIG. 13, at the input to first WDM 54. In this particular experimental arrangement, pump signal R was modulated at a frequency of 0.5 MHz, with an index modulation depth of approximately 1%. The graph of FIG. 15 depicts the RF spectrum of information signal I at the output of fiber 64 (as measured with RF spectrum analyzer 66), with the modulation of seed laser source 62 turned "off" (thus, simulating the conventional, prior art arrangement). The information signal output shows a 4.8% modulation index, with an RIN transfer efficiency of approximately 13.5 dB. Lastly, the graph of FIG. 16 depicts the improvement in amplifier performance when the intensity-modulation of the seed laser is utilized, in accordance with the teachings of the present invention. As shown, the RIN transfer has been essentially cancelled by use of a seed laser modulated at 0.5 MHz (same as the pump signal), with an appropriate amplitude and phase.

Figure 17:
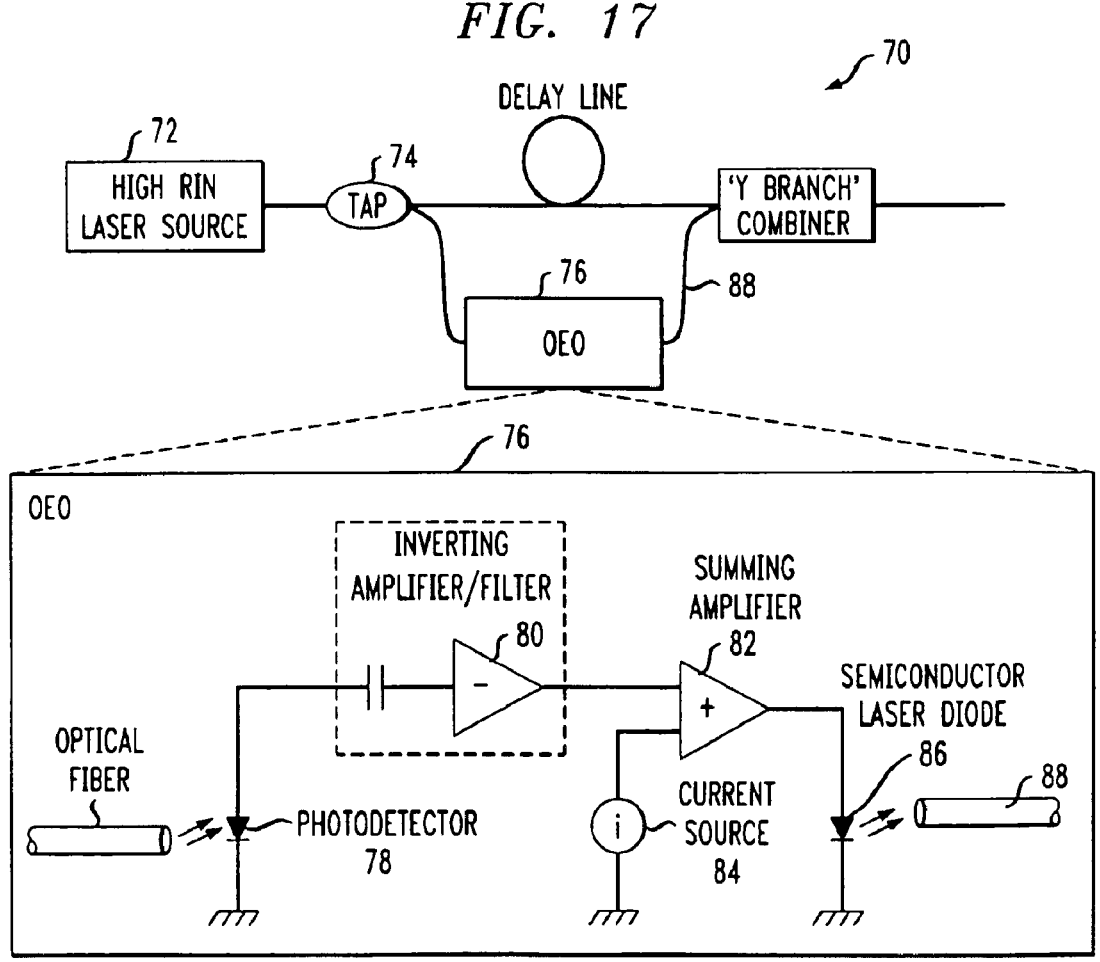
FIG. 17 illustrates an alternative embodiment of the present invention useful in a first-order Raman fiber amplifier system.
Figure 18:
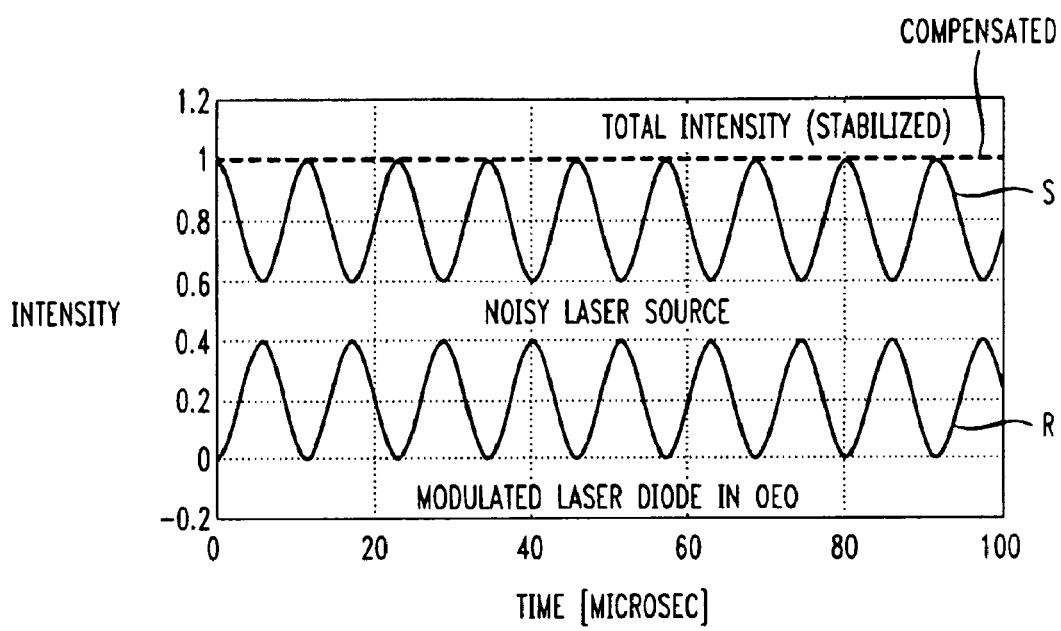
FIG. 18 is a graph of the various signals (pump, compensation, and information) associated with the arrangement of FIG. 17.

While the use of an intensity-modulated low power laser to compensate for the presence of RIN in a pump source is of particular importance in second- or third-order amplifier systems (that generally utilize "noisy" Raman fiber lasers as pump sources), the RIN compensation technique of the present invention can also be used with first-order Raman fiber amplifiers. FIG. 17 illustrates an exemplary first-order amplifier system 70 that applies the OEO converter technique of the present invention to minimize the presence of RIN in a pump signal prior to applying the pump to the input information signal. As shown, an exemplary pump source 72 is used, where it is presumed that pump source 72 exhibits a relatively high level of RIN. An optical tap 74 is used to remove a relatively small amount (e.g., 1%) of output pump signal R from pump source 72 and apply this signal as an input to an OEO converter 76. Using the method as described above, a photodetector 78 within converter 76 is used to convert the tapped-off optical output signal R into an electrical representation and apply it as an input to an inverting amplifier/filter 80. This "power fluctuation" output from amplifier/filter 80 is applied as a first input to a summing amplifier 82, where a constant current source 84 is used as the second input. The combination of the detected power fluctuation-based current and constant current then form the intensity-modulated input bias current to a (low power) laser diode 86. In contrast to the arrangements as described above, laser diode 86 of the first-order embodiment operates at the same wavelength (e.g., 1370 nm) as pump source 72, (alternatively, laser diode 86 may operate at a slightly different wavelength (by 1–3 nm, for example) than the pump source). The output signal S from OEO converter 76 is then coupled into an output fiber 88 and applied as first input to a Y-coupler 90. As shown in FIG. 17, the remaining (majority) portion of pump signal R passes through a delay line 92 and is applied as a second input to Y-coupler 80. Delay line 92 is formed to comprise a length sufficient to maintain phase matching between pump signal R and compensating signal S. As shown in the associated graph of FIG. 18, the utilization of OEO converter 76 in this first-order embodiment of the present invention functions to essentially remove the RIN fluctuations present in the pump signal prior to applying the pump, with an input information signal (not shown) to a conventional Raman fiber amplifier (not shown). FIG. 18 illustrates the improvement in performance of an exemplary first-order arrangement. In particular, FIG. 18 contains a graph of a "noisy" pump source R and an intensity-modulated compensation signal S used to negate the presence of the noise. The resultant, essentially "flat" pump signal is also shown in FIG. 18, where the use of such a "noise-less" pump signal in a Raman fiber amplifier will improve the gain characteristic, as well as the efficiency, of a Raman fiber amplifier.

Figure 19:
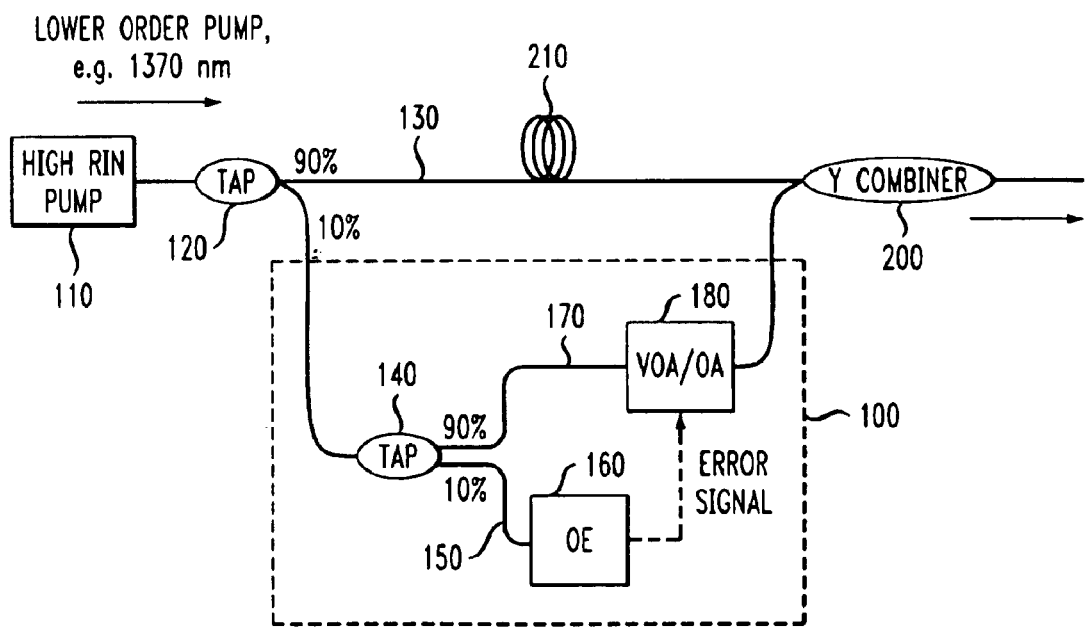
FIG. 19 contains a diagram of a generalized arrangement for providing RIN compensation for a pump laser source in accordance with the present invention.

FIG. 19 illustrates yet another embodiment of the present invention, that may be utilized with a pump source in any Raman fiber amplifier arrangement in order to compensate for the presence of relative intensity noise in the pump source and thus stabilize the pump output signal that is subsequently applied as an input to the Raman fiber amplifier. Referring to FIG. 19, a RIN compensation element 100 is disposed in a signal path to receive a portion (e.g., 10%) of the output signal from a pump source 110. In the particular example as illustrated in FIG. 19, pump source 110 comprises a fiber Raman laser source operating at a wavelength of 1370 nm, with an optical tap 120 used to direct a first portion of the output from pump source 110 into the input of RIN compensation element 100, with the remainder of the output from pump source 110 propagating along a signal path 130. In accordance with the teachings of the present invention, RIN compensation element 100 is used to monitor the power fluctuations present in the output from pump source 110 and generate a compensation signal based on this fluctuation to reduce the presence of RIN in the pump output signal. In the particular embodiment as illustrated in FIG. 19, RIN compensation element 100 comprises an optical 140 that is used to direct a relatively small portion (e.g., 10%) of the tapped-off signal along a signal path 150 and into an optical-to-electrical converter 160 (such as a photodiode), thus generating as an output an electrical signal representative of the power fluctuations present in the pump source output signal. Although not shown, it is presumed that converter 160 contains a similar amplifier/filter arrangement for generating the error output signal representative of the power fluctuations in the pump source. The remainder of the tapped-off pump output signal propagates along a signal path 170 and is applied as an input to an electronically-controlled optical device 180, such as a variable optical attenuator (e.g., a Mach-Zehnder interferometer) or a variable optical amplifier (e.g., a semiconductor optical amplifier). In any of these devices, an input optical signal is modulated by an applied electrical bias signal to generate an optical output signal. In accordance with the present invention, the electrical output signal from optical-to-electrical converter 160 is used to provide the needed electrical input. The output signal from electronically-controlled optical device 180 is then applied as an input along signal path 190, and coupled with the original pump signal, as shown in FIG. 19, within an optical coupler 200. In order to maintain a proper phase relationship between the original pump signal and the compensation signal, a delay element 210 is included along signal path 130.

What is claimed is:

1. An arrangement for reducing the effects of relative intensity noise (RIN) associated with an optical pump source in a Raman fiber amplifier, the arrangement comprising:
    a pump source for supplying a first optical pump signal capable of generating gain in an optical information signal propagating along the Raman fiber amplifier;
    a compensating, low power laser source for providing a second optical pump signal input to said Raman fiber amplifier; and
    a power monitoring arrangement responsive to a portion of the output signal from the pump source for generating therefrom an intensity-modulated bias current input for said compensating, low power laser, said low power laser thus exhibiting an output power controlled by said modulating bias current to stabilize the net gain provided to the optical information signal propagating along said Raman fiber amplifier and minimize the effects of RIN associated with said pump source.

2. An arrangement as defined in claim 1 wherein the compensating, low power laser source comprises a semiconductor laser diode device.

3. An arrangement as defined in claim 1 wherein the arrangement further comprises
    a signal tap for removing a portion of the first optical pump signal output from the pump source and applying the tapped-out portion as an input to the power monitoring arrangement;
    a first coupler for multiplexing the second optical pump signal output signal from the low power laser source with the first optical pump signal output from said pump source; and
    a second coupler for coupling the multiplexed first and second pump signals with the optical information signal propagating along a second fiber, and introducing the coupled signals into a fiber span of the Raman fiber amplifier.

4. An arrangement as defined in claim 3 wherein the first and second couplers comprise wavelength division multiplexers.

5. An arrangement as defined in claim 1 wherein the power monitoring arrangement comprises
    a photodetector for recovering a portion of the first optical pump signal output from the pump source and converting said first optical pump signal output into an electrical representation;
    an inverting amplifier coupled to the output of the photodetector for generating a phase-matched "difference" signal output indicative of power fluctuations in the pump source output signal;
    a constant current source of a bias current I; and
    a summing amplifier, receiving as a first input the difference signal output from the inverting amplifier and as a second input the bias current from the constant current source, providing as an output an intensity-modulated bias current that varies as a function of power fluctuations monitored in the pump source, the bias current applied as an input to the compensating low power laser source.

6. The arrangement as defined in claim 1 wherein the pump source comprises a Raman fiber laser.

7. The arrangement as defined in claim 1 wherein the Raman fiber amplifier comprises a second-order amplifier, with the low power compensating laser source comprising a seed laser source, operating at a wavelength different from the pump source, said seed laser source thus generating as an output a seed compensating signal for reducing RIN transfer between the pump and the optical information signal.

8. The arrangement as defined in claim 7 wherein the pump source operates at a wavelength of approximately 1365 nm and power of 1 W, the seed laser source operates at a wavelength of approximately 1455 nm and the optical input signal operates at a wavelength of approximately 1550 nm.

9. The arrangement as defined in claim 1 wherein the Raman fiber amplifier comprises a higher-order amplifier, with a plurality of low power compensating laser sources used to generate the required Stokes shifts.

10. The arrangement as defined in claim 1 wherein the low power compensating laser source operates at essentially the same wavelength as the pump source, said compensating laser source thus generating as an output a compensation signal for essentially removing the RIN present in the pump signal prior to supplying said pump signal as an input to the fiber in the Raman fiber amplifier.

11. The arrangement as defined in claim 1 wherein the pump source and the low power compensating laser source propagate in the same direction as the optical input signal through the Raman fiber amplifier.

12. The arrangement as defined in claim 1 wherein the pump source and the low power compensating laser source propagate in the opposite direction as the optical input signal.

13. An arrangement for reducing relative intensity noise in an optical pump source for a Raman fiber amplifier, the arrangement comprising
    an optical tap for removing a portion of the output signal from the optical pump source to form a tapped-off monitoring signal;
    an optical signal splitter responsive to the tapped-off monitoring signal to form a first optical monitoring signal and a second optical monitoring signal;
    an optical-to-electrical converter responsive to the first optical monitoring signal to generate an electrical bias current representative of the power fluctuations present in the output signal from the optical pump source;
    a variable optical attenuator responsive to both the second optical monitoring signal and the electrical bias current to generate as an output a compensation signal representative of power fluctuations in the optical pump output signal; and
    a signal coupler for combining the pump source output signal and the compensation signal to form a stabilized optical pump signal with reduced relative intensity noise.

14. The arrangement as defined in claim 13 wherein the variable optical attenuator comprises a Mach-Zehnder interferometer.

* * * * *